United States Patent [19]

Ban et al.

[11] Patent Number: 5,380,471
[45] Date of Patent: Jan. 10, 1995

[54] AERATION APPARATUS FOR PRODUCING ULTRAPURE WATER

[75] Inventors: Cozy Ban; Motonori Yanagi; Takaaki Fukumoto, all of Itami; Toshiki Manabe; Hiroshi Yanome, both of Toda, all of Japan

[73] Assignees: Mitsubishi Denki Kabushiki Kaisha; Japan Organo Co., Ltd., both of Tokyo, Japan

[21] Appl. No.: 203,611

[22] Filed: Feb. 28, 1994

Related U.S. Application Data

[63] Continuation of Ser. No. 921,573, Jul. 30, 1992, abandoned.

[30] Foreign Application Priority Data

Jul. 31, 1991 [JP] Japan .................. 3-191559

[51] Int. Cl.⁶ .............................................. B01F 3/04
[52] U.S. Cl. .................... 261/122.1; 261/DIG. 75; 210/205; 210/760; 210/758
[58] Field of Search ............ 261/DIG. 75, 123, 122.1; 210/758, 760, 205

[56] References Cited

U.S. PATENT DOCUMENTS

| | | | |
|---|---|---|---|
| 2,195,981 | 4/1940 | Conant | 261/DIG. 75 |
| 2,413,102 | 12/1946 | Ebert et al. | 261/DIG. 75 |
| 3,271,304 | 9/1966 | Valdespino et al. | 261/DIG. 75 |
| 3,371,779 | 3/1968 | Hollingsworth et al. | 261/122.1 |
| 3,516,647 | 6/1970 | Jaffe et al. | 261/122.1 |
| 4,210,534 | 7/1980 | Molvar | 261/DIG. 75 |
| 4,287,054 | 9/1981 | Hollingsworth | 261/DIG. 75 |
| 4,466,928 | 8/1984 | Kos | 261/DIG. 75 |
| 4,477,393 | 10/1984 | Kos | 261/DIG. 75 |
| 4,533,123 | 8/1985 | O'Leary | 261/DIG. 75 |
| 4,597,877 | 7/1986 | Gaia | 261/DIG. 75 |
| 4,639,313 | 1/1987 | Zipperian | 261/DIG. 75 |
| 4,885,084 | 12/1989 | Doyle | 261/DIG. 75 |
| 4,956,080 | 9/1990 | Josefik | 261/DIG. 75 |
| 5,015,370 | 5/1991 | Fricano | 261/DIG. 75 |

FOREIGN PATENT DOCUMENTS

| | | |
|---|---|---|
| 3402699 | 8/1985 | Germany . |
| 3632937 | 3/1988 | Germany . |
| 3642638 | 6/1988 | Germany . |
| 3919885 | 12/1990 | Germany . |
| 0003571 | 1/1977 | Japan .......... 261/DIG. 75 |
| 63-36899 | 2/1988 | Japan . |
| 95365 | 7/1922 | Switzerland .......... 261/DIG. 75 |

*Primary Examiner*—Tim Miles
*Attorney, Agent, or Firm*—Leydig, Voit & Mayer

[57] ABSTRACT

In an aeration apparatus and method for producing ultrapure water, a device for vigorously mixing an aeration gas with untreated water is attached to a water pipe through which the water is fed to a reaction tank. The device vigorously mixes the aeration gas with the untreated water in the water pipe before the water reaches the reaction tank. The reaction tank can be smaller, an aeration system for producing ultrapure water can be simpler, and the efficiency of the aeration system can be improved.

5 Claims, 3 Drawing Sheets

AERATION APPARATUS FOR PRODUCING ULTRAPURE WATER

This disclosure is a continuation of application Ser. No. 07/921,573, filed Jul. 30, 1992, now abandoned.

BACKGROUND OF THE INVENTION

1. Field of the Invention

The present invention relates to an aeration apparatus and method for producing ultrapure water. More particularly, it pertains to an aeration apparatus and method used in producing ultrapure water in which untreated water is aerated with ozone ($O_3$), or oxygen ($O_2$), thereby effecting oxidative destruction of organic matter and converting colloidal substances into solid fine particles that can be removed from the water.

2. Description of the Related Art

FIG. 5 is a schematic view showing a conventional aerating device for producing ultrapure water. Referring to FIG. 5, water to be treated for the oxidative destruction of organic matter and the conversion of colloidal substances into solid fine particles (hereinafter referred to as untreated water) is supplied by an unillustrated pump from a water pipe 5 into a reaction tank 1, which pipe 5 is provided on one lower side of the reaction tank 1. An aeration gas pipe 2 is also provided on the lower side of the reaction tank 1, and extends to the other lower side of the tank 1. The aeration gas pipe 2 is used for feeding an aeration gas, such as ozone ($O_3$), into the reaction tank 1. Many perforations 3 for injecting the aeration gas into the reaction tank 1 are present in the aeration gas pipe 2. Screens 4a to 4c are located in the reaction tank 1. A discharge pipe 7 is connected to the upper side of the reaction tank 1, and is used for discharging aerated water. The discharge pipe 7, to which a discharge pump 8 is connected, leads to a gas-liquid separation tank 9. A discharge pipe 6 for discharging excessive gas is connected to the ceiling of the reaction tank 1, and means 10 for removing the aeration gas is connected to the exhaust pipe 6.

The conventional aeration apparatus for producing ultrapure water is constructed as described above. The untreated water is fed through the water pipe 5 into the reaction tank 1, where an appropriate amount of untreated water is stored. While the untreated water is being fed, the aeration gas is also fed from the aeration gas pipe 2 and injected through the perforations 3 into the reaction tank 1. The aeration gas is then formed into bubbles which rise in the reaction tank 1.

The term "aeration" refers to the fact that the aeration gas is mixed with and dissolved in the untreated water, whereby the oxidative destruction of organic matter is effected and colloidal substances contained in the water are converted into solid fine particles. Factors, such as the efficiency at which the gas contacts the liquid (gas-liquid contact efficiency) and the solubility of the aeration gas, contribute to the aeration efficiency. Since the diameter of each bubble emerging from the perforations 3 is large, the screens 4a to 4c are provided in order to atomize the bubbles so that the surface area of each bubble increases and the speed at which the bubbles rise decreases, thereby enhancing the gas-liquid contact efficiency.

The fine bubbles of the aeration gas are mixed with and dissolved in the untreated water in the reaction tank 1. Thus, the aeration proceeds. Treated water which has been aerated is drawn by the discharge pump 8, and then led to the gas-liquid separation tank 9 through the discharge pipe 7. The aeration gas dissolved in the treated water is removed in the gas-liquid separation tank 9. The aeration gas which has not been dissolved in the untreated water is discharged through the discharge pipe 6 by the aeration gas removing means 10, such as "AKH2", which is a honeycomb ozone decomposition system manufactured by Kobe Steel Ltd.

In the above-described aeration apparatus for producing ultrapure water, even when the screens 4a to 4c are used, the aeration gas is not formed into sufficiently fine bubbles. In addition, the aeration gas comes into contact with the untreated water only because of the buoyant force of the bubbles. For these reasons, the solubility of the aeration gas in the untreated water is low, thus resulting in poor aeration efficiency. If the time during which the aeration gas is in contact with the untreated water is to be extended in order to enhance the solubility of the gas, the reaction tank has to be large, which entails a higher equipment cost.

SUMMARY OF THE INVENTION

The present invention has been made to solve the above problems. Accordingly, the object of this invention is to provide an aeration apparatus and method for improving the aeration efficiency, thereby minimizing the size of the reaction tank used for producing ultrapure water.

In order to achieve the above object, according to one aspect of the present invention, there is provided an aeration apparatus for producing ultrapure water, comprising: a reaction tank; a pipe for feeding untreated water into the reaction tank; means for vigorously mixing aeration gas with the untreated water in the pipe immediately upstream of the reaction tank; means for separating gas from water in the reaction tank; and means connected to the reaction tank for discharging water which has been aerated.

According to another aspect of this invention, there is provided a method of aerating untreated water for producing ultrapure water, comprising the steps of: vigorously mixing an aeration gas with untreated water; transporting the untreated water with which the aeration gas is mixed to a reaction tank; and oxidatively destroying organic matter in the untreated water and converting colloidal substances in the untreated water into solid fine particles.

The aeration apparatus according to the present invention constitutes one of the system components for producing ultrapure water. That is to say, the aeration apparatus is to be used in combination with other means such as ion exchange, filtration, reverse osmosis, ultrafiltration, UV irradiation and so forth for producing ultrapure water.

DESCRIPTION OF THE PREFERRED EMBODIMENTS

Figure 1:
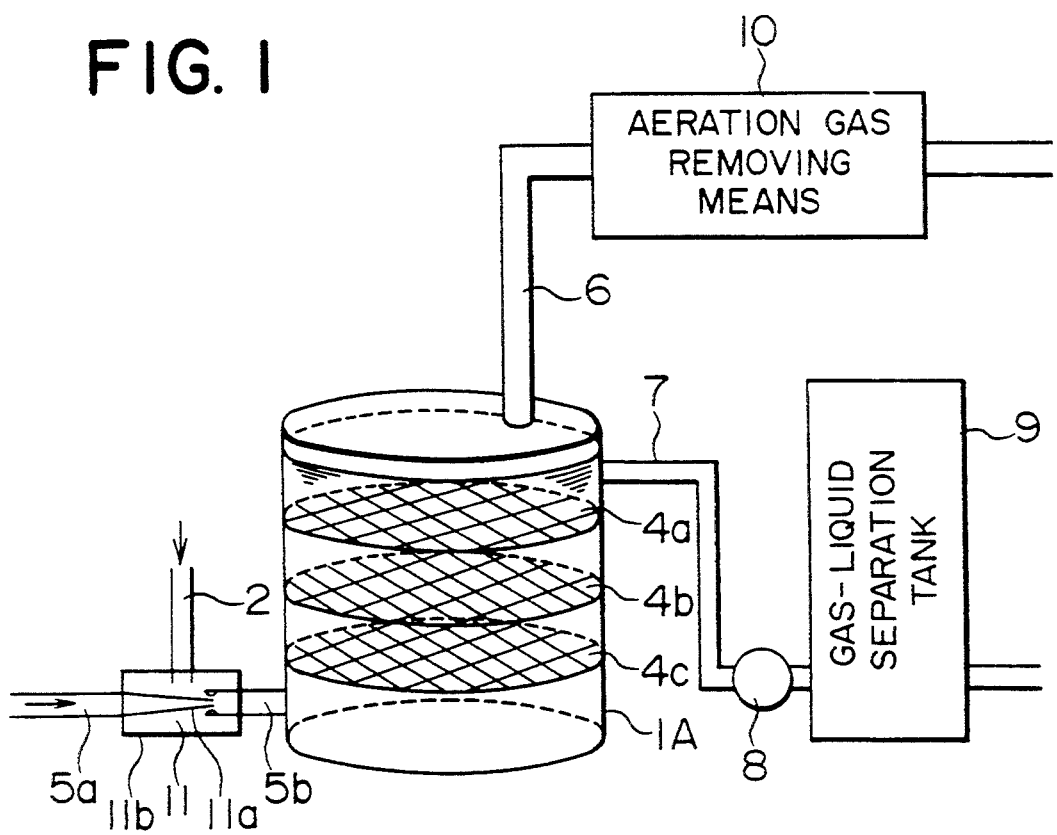
FIG. 1 is a schematic view showing an aeration apparatus for producing ultrapure water according to an embodiment of the present invention.

FIG. 1 is a schematic view of an aeration apparatus used in producing ultrapure water according to an embodiment of the present invention. Like reference characters denote the same or corresponding components throughout the drawings. In FIG. 1, an aspirator or water jet pump 11, serving as aeration gas mixing means or an injector, is connected to a water pipe 5a through which untreated water is fed. The aeration gas mixing means is used for vigorously mixing the aeration gas with the untreated water. An aeration gas feed pipe 2 for feeding the aeration gas is linked to the aspirator 11. The aspirator 11 is coupled to another water pipe 5b, having a fixed length, which is in turn coupled to the lower portion of a reaction tank 1A.

In the thus-constructed aeration apparatus for producing ultrapure water, the untreated water is fed by an unillutrated pump through the water pipe 5a and then the aspirator 11. During such feeding, when the untreated water is injected through a tapered nozzle 11a, the pressure drops inside an aspirator container 11b. The aeration gas is thus vigorously mixed with the untreated water which becomes turbid, turning white. Thus, the aeration gas is formed into extremely fine bubbles. The area of each bubble in contact with the untreated water is increased per unit volume of water. Consequently, a large amount of aeration gas is dissolved in the untreated water, thus improving the aeration efficiency. Aeration starts immediately after the aeration gas has been mixed with the untreated water inside the aspirator 11. The aeration gas continues to be dissolved in the untreated water. The aeration proceeds even before the untreated water reaches the reaction tank 1A.

The untreated water with which the aeration gas has been mixed is led through the water pipe 5b to the reaction tank 1A and then to the screens 4a to 4c in the same manner as in the conventional apparatus. In the apparatus of this invention, although the aeration gas is formed into extremely fine bubbles, the bubbles may adhere to each other while they are fed through the water pipe 5b, thereby increasing the size of the bubbles. The screens 4a to 4c are provided to reduce the size of the bubbles and to decrease the speed at which the aeration gas rises. The gas-liquid contact efficiency is improved. In this way, while the aeration proceeds, the aeration gas continues to be mixed with and dissolved in the untreated water.

Treated water which has been aerated is drawn by a discharge pump 8, and then discharged through a discharge pipe 7 to a gas-liquid separation tank 9. In the gas-liquid separation tank 9, the aeration gas dissolved in the treated water is removed. The aeration gas which has not been dissolved in the untreated water is discharged through a discharge pipe 6 into the aeration gas removing means 10.

A description will now be given of an embodiment in which the aeration apparatus of this invention is employed in the production of ultrapure water.

An aeration apparatus equipped with a reaction tank having a height of 1 m and a capacity of 200 l was used to conduct an aeration treatment where the flow rate of the untreated water was 300 l per hour, and the pressure for feeding the untreated water ranged from 0.5 to 1.0 kg/cm$^2$. 26 g per hour of ozone was fed to an aspirator, 22 g (85%) of which ozone was dissolved in the untreated water. When an aeration treatment was performed using the conventional apparatus under the same conditions as described above, only 7.9 g (30%) of the ozone was dissolved. The simple apparatus of this invention was capable of increasing the solubility of ozone approximately three-fold. The aeration efficiency improved accordingly making it possible to render the reaction tank smaller. Because of the use of the aspirator, the aeration gas can be mixed with the untreated water in proportion to the flow rate of the untreated water being fed through the water pipe 5a.

Figure 2:
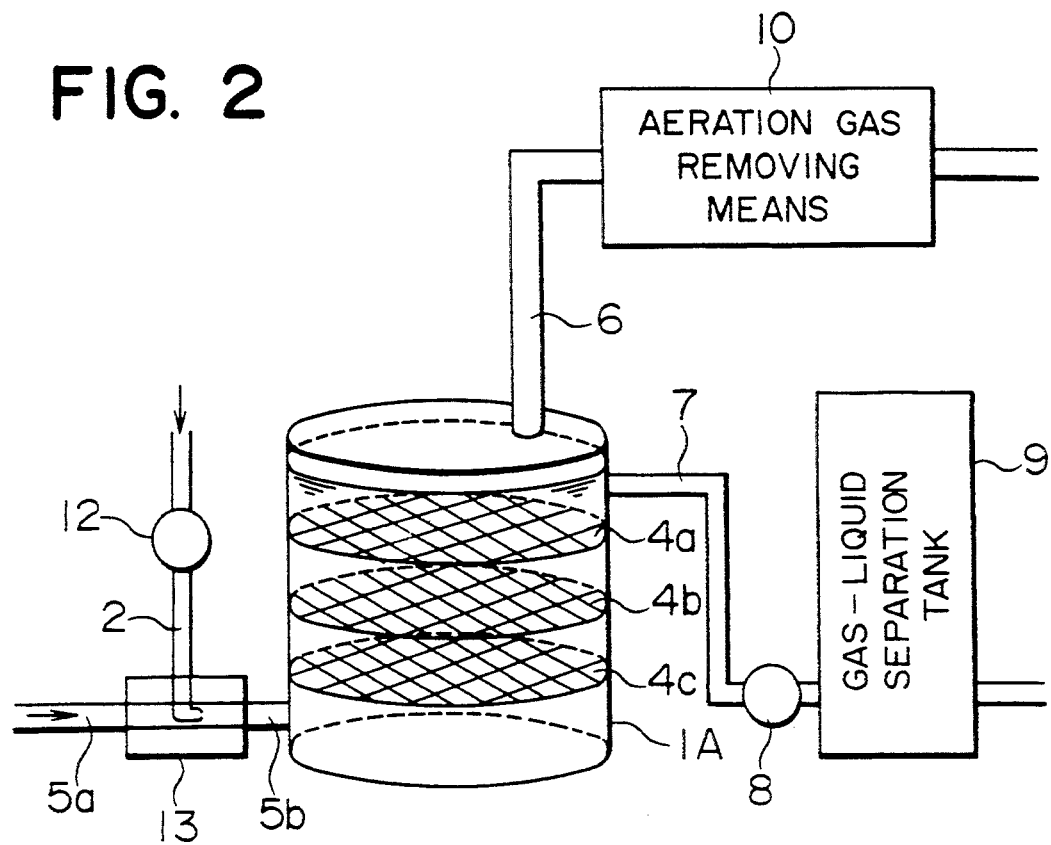
FIG. 2 is a schematic view showing an aeration apparatus for producing ultrapure water according to another embodiment of this invention.

In the above-described embodiment, the aspirator 11 is used as the aeration gas mixing means. As shown in FIG. 2, however, an aeration gas mixing device 13 may also be used in which a pump 12 is provided for forcibly mixing the aeration gas with the untreated water. Aeration can also be carried out very effectively by using such a device 13.

Figure 3:
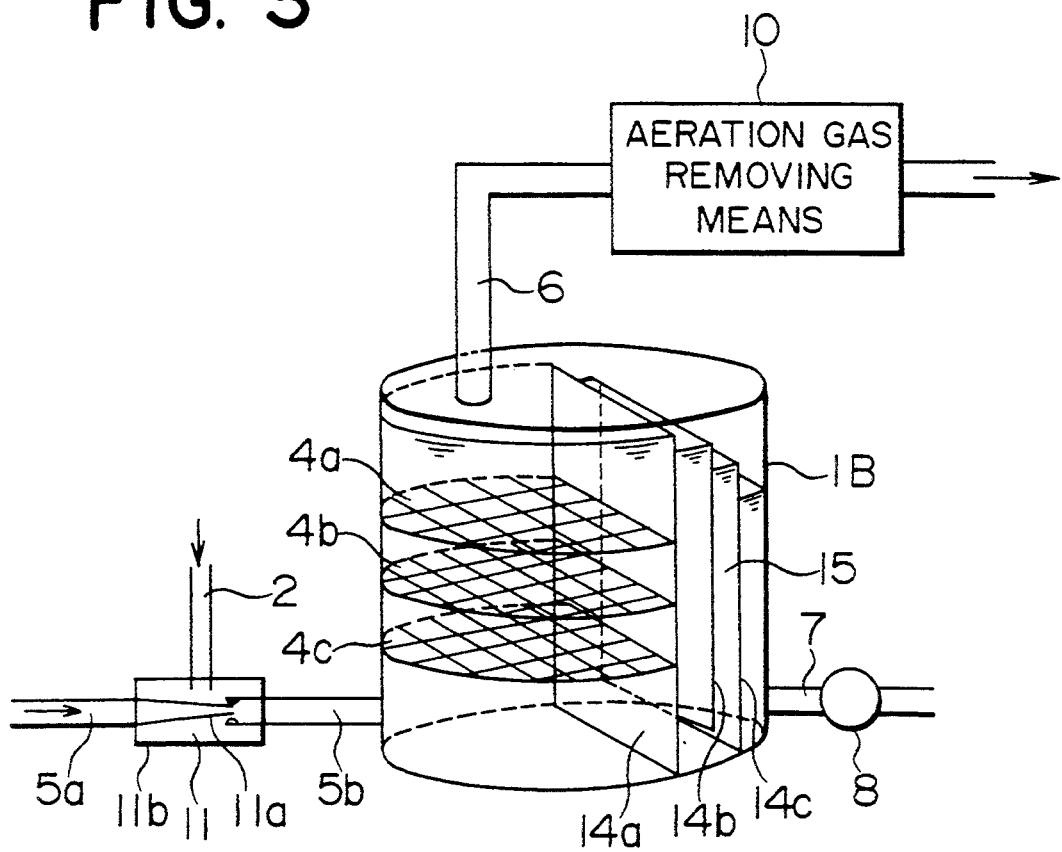
FIG. 3 is a schematic view showing an aeration apparatus for producing ultrapure water according to a further embodiment of this invention.
Figure 4:
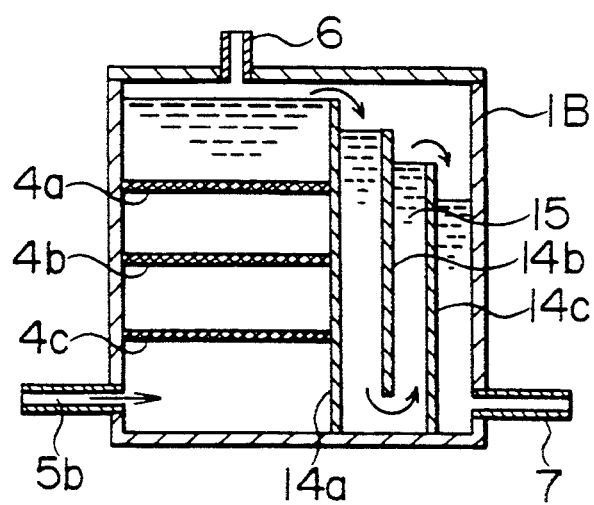
FIG. 4 is a vertical sectional view showing components of the aeration apparatus shown in FIG. 3.
Figure 5:
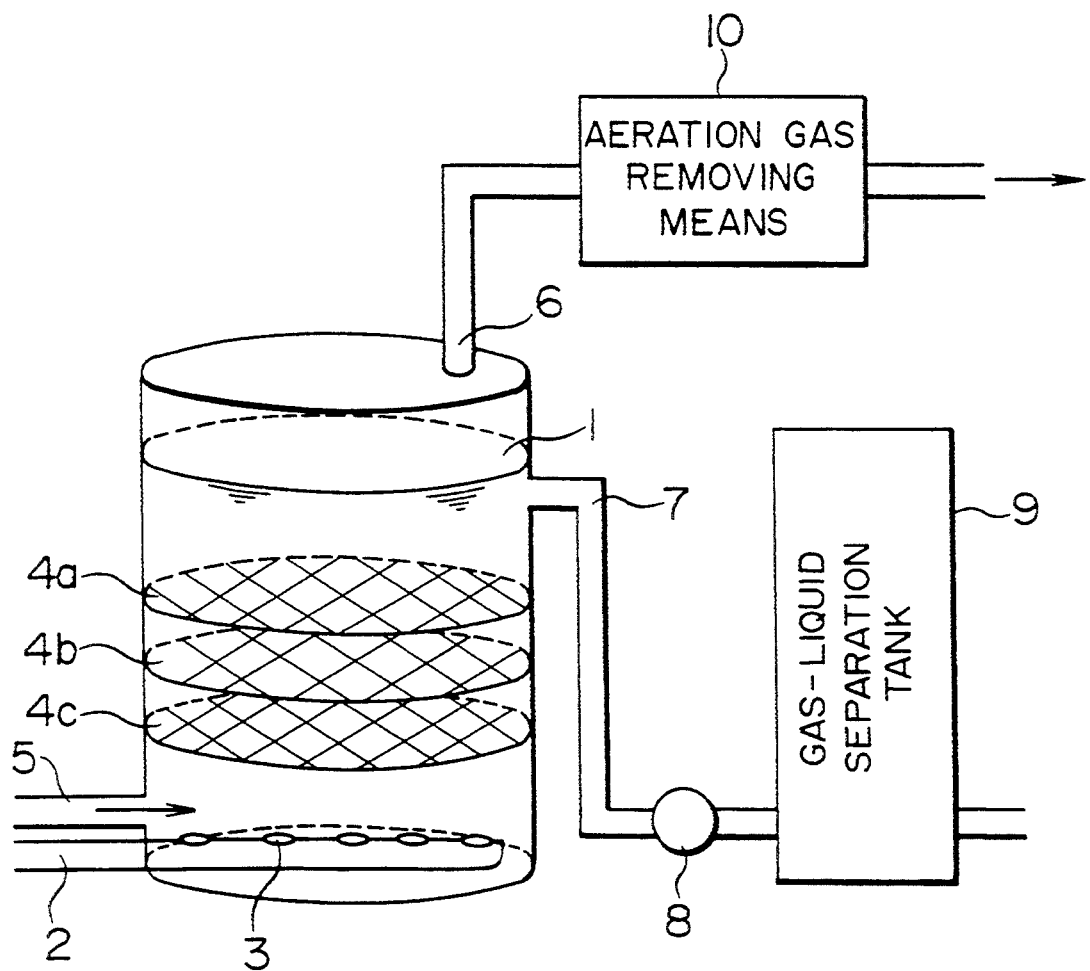
FIG. 5 is a schematic view showing a conventional aeration apparatus for producing ultrapure water.

The aeration efficiency is thus improved and the reaction tank 1A can be made smaller. Therefore, if the same space as is required for a conventional aeration tank is available, a gas-liquid separation tank may be incorporated into the reaction tank according to the present invention. Space can thus be effectively utilized. FIGS. 3 and 4 show an embodiment in which a gas-liquid separation tank 15 having partitions 14a to 14c is incorporated into a reaction tank 1B. The gas-liquid separation tank 15 is the same as a conventional gas-liquid separation tank.

In the embodiment mentioned above, a description has been given of ozone aeration of water for the oxidative destruction of organic matter and the conversion of colloidal substances into solid fine particles. However, the apparatus and method according to the present invention may also be applied to aeration of water with any other oxidizing gas such as oxygen ($O_2$) thereby gaining many of the same advantages as described above.

This invention may also be applied to the aeration of an inert gas, such as nitrogen ($N_2$) gas, to reduce dissolved oxygen in the process of producing ultrapure water. The same advantages as those mentioned above can be gained, in such applications. This invention may equally be applied when any other gases are to be mixed with water.

What is claimed is:

1. An aeration apparatus used in producing ultrapure water comprising:

a reaction tank vertically divided into first and second sections, the first section including an inlet at a bottom of said reaction tank for receiving a liquid and the second section including an outlet at the bottom of said reaction tank;

a plurality of screens disposed within the first section of said reaction tank;

an aspirator including an inlet water pipe for admitting water to said aspirator, a gas feed pipe for supplying an aeration gas to said aspirator and for vigorously mixing the aeration gas with the water, and an outlet water pipe for supplying aerated water to the inlet of said reaction tank, wherein colloidal substances in the aerated water are converted into fine particles;

gas-liquid separation means disposed within the second section of said reaction tank for removing the aeration gas from the water including the particles in the second section of said reaction tank; and means connected to the outlet of said reaction tank for discharging water from said reaction tank.

2. The apparatus as claimed in claim 1 wherein the aeration gas is ozone.

3. The apparatus as claimed in claim 1 wherein the aeration gas is oxygen.

4. The apparatus as claimed in claim 1 wherein the aeration gas is nitrogen.

5. The apparatus of claim 1 wherein the gas-liquid separation means comprises a plurality of vertical partitions having decreasing heights along a path of flow of water in the second section of said reaction tank for controlling flow of water from the first section of said reaction tank to the outlet of said reaction tank.

* * * * *